US010068567B1

(12) United States Patent
Hermush et al.

(10) Patent No.: US 10,068,567 B1
(45) Date of Patent: Sep. 4, 2018

(54) SYSTEM, METHOD, AND COMPUTER PROGRAM FOR AUTOMATIC MANAGEMENT OF INTENT CLASSIFICATION

(71) Applicant: Amdocs Development Limited, Limassol (CY)

(72) Inventors: Yosef Asaf Hermush, Tel Aviv (IL); Eran Yosef Paran, Hod Hasharon (IL); Liat Taub Bahar, Kfar Sabba (IL); Sarit Chehanowitz, Tel Aviv (IL); Tsvi Haim Lev, Kiryat Bialik (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/394,674

(22) Filed: Dec. 29, 2016

(51) Int. Cl.
*H04M 3/51* (2006.01)
*G10L 15/18* (2013.01)
(Continued)

(52) U.S. Cl.
CPC ...... *G10L 15/1815* (2013.01); *G06Q 10/0631* (2013.01); *G10L 15/063* (2013.01); *G10L 15/22* (2013.01); *H04M 3/51* (2013.01); *H04M 3/5183* (2013.01); *G10L 2015/0635* (2013.01); *H04M 2201/40* (2013.01); *H04M 2201/60* (2013.01); *H04M 2203/40* (2013.01); *H04M 2203/555* (2013.01)

(58) Field of Classification Search
CPC .............................. H04M 3/51; H04M 3/5183
See application file for complete search history.

(56) References Cited

U.S. PATENT DOCUMENTS

| 6,014,647 | A | * | 1/2000 | Nizzari | G06Q 20/10 |
| | | | | | 705/39 |
| 7,869,586 | B2 | | 1/2011 | Conway et al. | |

(Continued)

*Primary Examiner* — Samuel G Neway
(74) *Attorney, Agent, or Firm* — Zilka-Kotab, P.C.

(57) ABSTRACT

A system, method, and computer program product are provided for automatic management of intent classification. In operation, an intent classification system identifies a conversation including a plurality of utterances for which to identify intent of a user associated with the plurality of utterances. The intent classification system identifies one or more actions performed in association with the plurality of utterances. Further, the intent classification system correlates at least one of the one or more actions to at least one of the plurality of utterances based on which of the one or more actions were performed as a result of the plurality of utterances. The intent classification system automatically determines an intent of the user based on the correlation of the at least one of the one or more actions to the at least one of the plurality of utterances. Additionally, the intent classification system stores an indication of the intent based on the at least one of the plurality of utterances. Moreover, the intent classification system associates one or more specific actions with the indication of intent such that subsequent utterances are capable of being used by the intent classification system to automatically identify an intent of one or more users and to automatically identify specific actions that should be performed based on the automatically identified intent of the one or more users.

11 Claims, 5 Drawing Sheets

(51) Int. Cl.
*G10L 15/06* (2013.01)
*G10L 15/22* (2006.01)
*G06Q 10/06* (2012.01)

(56) References Cited

U.S. PATENT DOCUMENTS

| | | | |
|---|---|---|---|
| 8,326,643 B1 | 12/2012 | Eshkenazi et al. | |
| 8,687,776 B1 | 4/2014 | Reynolds et al. | |
| 8,694,304 B2 | 4/2014 | Larcheveque et al. | |
| 9,307,085 B1* | 4/2016 | Hanson | H04M 3/5235 |
| 2005/0203878 A1* | 9/2005 | Brill | G06F 17/3064 |
| 2006/0056602 A1* | 3/2006 | Bushey | G10L 15/063 |
| | | | 379/88.04 |
| 2014/0067375 A1 | 3/2014 | Wooters | |
| 2014/0207446 A1* | 7/2014 | Klein | G10L 21/10 |
| | | | 704/233 |
| 2014/0244249 A1 | 8/2014 | Mohamed et al. | |
| 2015/0288818 A1* | 10/2015 | Srivastava | G10L 15/22 |
| | | | 379/88.01 |
| 2015/0302002 A1* | 10/2015 | Mathias | G06F 17/279 |
| | | | 704/9 |
| 2016/0078456 A1* | 3/2016 | Chakraborty | G06Q 30/0202 |
| | | | 705/7.31 |

* cited by examiner

SYSTEM, METHOD, AND COMPUTER PROGRAM FOR AUTOMATIC MANAGEMENT OF INTENT CLASSIFICATION

FIELD OF THE INVENTION

The present invention relates to automatic management of intent classification.

BACKGROUND

Customer care systems often focus on analyzing interactions between customer service representatives (CSRs) and customers. Goals of such analysis include ensuring that future interactions with customers are efficient and that customer service representatives provide services required to satisfy any issues or questions of the customers.

Knowing the intent of a caller based on what the caller says is an important step to ensure that customer service representatives meet their goals of satisfying the customer. Some customer care systems utilize intent classifiers to guess at the intent of callers based on conversations with the callers. To date, building and maintaining the intent classifiers has been a time consuming manual and error prone process.

There is thus a need for addressing these and/or other issues associated with the prior art.

SUMMARY

A system, method, and computer program product are provided for automatic management of intent classification. In operation, an intent classification system identifies a conversation including a plurality of utterances for which to identify intent of a user associated with the plurality of utterances. The intent classification system identifies one or more actions performed in association with the plurality of utterances. Further, the intent classification system correlates at least one of the one or more actions to at least one of the plurality of utterances based on which of the one or more actions were performed as a result of the plurality of utterances. The intent classification system automatically determines an intent of the user based on the correlation of the at least one of the one or more actions to the at least one of the plurality of utterances. Additionally, the intent classification system stores an indication of the intent based on the at least one of the plurality of utterances. Moreover, the intent classification system associates one or more specific actions with the indication of intent such that subsequent utterances are capable of being used by the intent classification system to automatically identify an intent of one or more users and to automatically identify specific actions that should be performed based on the automatically identified intent of the one or more users.

DETAILED DESCRIPTION

Figure 1:
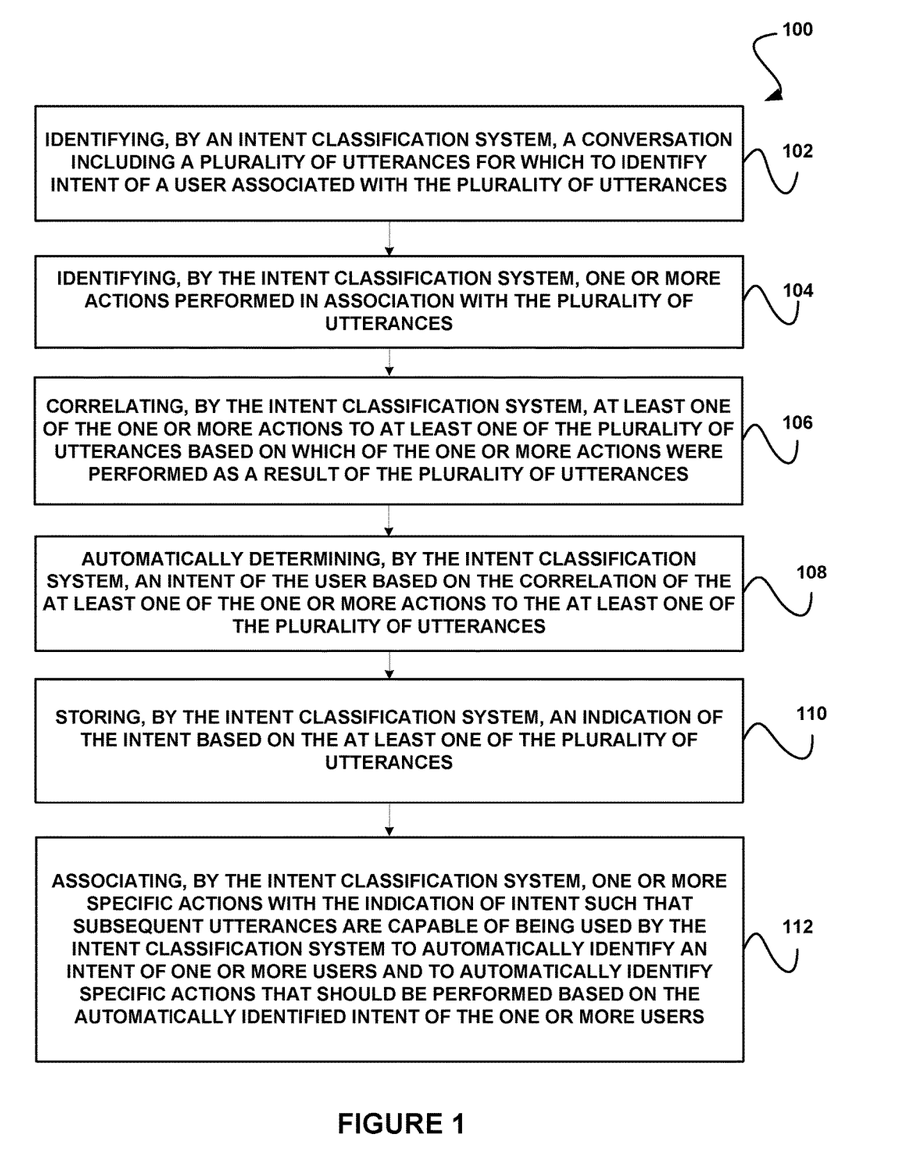
FIG. 1 illustrates a method for automatic management of intent classification, in accordance with one embodiment.

FIG. 1 illustrates a method 100 for automatic management of intent classification, in accordance with one embodiment.

In operation, an intent classification system identifies a conversation including a plurality of utterances for which to identify intent of a user associated with the plurality of utterances. See operation 102. In one embodiment, the conversation including the utterances may include a conversation between a customer service representative (CSR) and the user (i.e. a customer). In this case, the customer service representative may be associated with various industries, such as a retail industry or the telecommunication industry, etc.

The conversation may include a conversation that has occurred and was logged as part of a customer interaction. For example, the conversation may have been recorded as a verbal conversation but may have been converted into text transcripts.

The intent classification system identifies one or more actions performed in association with the utterances. See operation 104. Further, the intent classification system correlates at least one action to at least one of the utterances based on which of the actions were performed as a result of the utterances. See operation 106.

The actions performed may include any action or process performed as a result of the user speaking. For example, the actions performed in association with the utterances may include portions of a business process, an entire business process, or a plurality of business processes. The actions may also include searching the Internet, database actions, and many other individual actions that are not a business process. The actions may also include an event, such as a customer service representative getting angry, or anything that is measure of an interaction between a customer service representative and a customer.

Additionally, the actions performed in association with the utterances may include actions performed by a customer service representative in response to the user speaking the utterances. In this case, the actions performed may be logged in a manner that correlates to corresponding portions of the utterances. For example, a time stamp of an utterance and an action may be used to correlate the utterance and the action(s).

The intent classification system automatically determines an intent of the user based on the correlation of the action(s) to the utterance(s). See operation 108. The intent of the user may be determined based on the actions that were performed in response to one or more of the utterances.

Additionally, the intent classification system stores an indication of the intent based on the utterance(s). See operation 110. The indication of intent may include any indicator of what the user wants or what actions should be performed based on specific utterances.

The intent classification system associates one or more specific actions with the indication of intent such that subsequent utterances are capable of being used by the intent classification system (or any other system) to automatically identify an intent of one or more users and to automatically identify specific actions that should be performed based on the automatically identified intent of the users. See operation 112. Thus, the intent classification system (or any other system) may utilize the indication of intent to automatically identify the intent of the one or more users (e.g. callers to a CSR, etc.) to automatically identify the specific actions that should be performed based on the automatically identified intent of the users. This may be used to verify that the correct actions have been performed based on the identified user intent and/or to automatically perform the actions which are determined to be required based on utterances of the user. The specific actions associated with the indication of intent may include any action and may include a portion of a business process, an entire business process, or a plurality of business processes.

In addition to using the utterances to determine intent, in one embodiment, customer data may also be examined. For example, the intent classification system may correlate data associated with the user to one or more utterances. In this case, the intent classification system may automatically determine the intent of the user based on the correlation of the actions to at least one of the utterances and the data associated with the user. The data associated with the user may include any type of data, such as a location associated with the user, a gender associated with the user, a profile associated with the user, and/or an age associated with the user, etc. The data may also include information associated with what a company knows about the user, which can be used to guess intent. For example, such information may include an indication that the user has not used a phone for a month, received a large bill, or has to renew a subscription. The information may also include information about the family of the user. The information may also be related to the fact that there was an electric issue in the user's city. The information may also be related to some event in the neighborhood, such as a drive for a new product, etc.

The intent classification system may be used to build a database of intent (i.e. an intent classifier) and to manage the database of intent. For example, the intent classification system may determine whether utterances are already associated with a previously stored indication of intent prior to storing the indication of the intent based on the utterances. In this case, if it is determined that the utterance is already associated with the previously stored indication of intent, the intent classification system may determine whether to update the previously stored indication of intent. If it is determined that that the utterance is not already associated with a previously stored indication of intent the intent classification system may store the indication of the intent based on the utterance.

It should be noted that the method 100 may be implemented utilizing various systems, hardware, software, applications, user interfaces, etc., as dictated by the implementer. For example, the intent classification system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
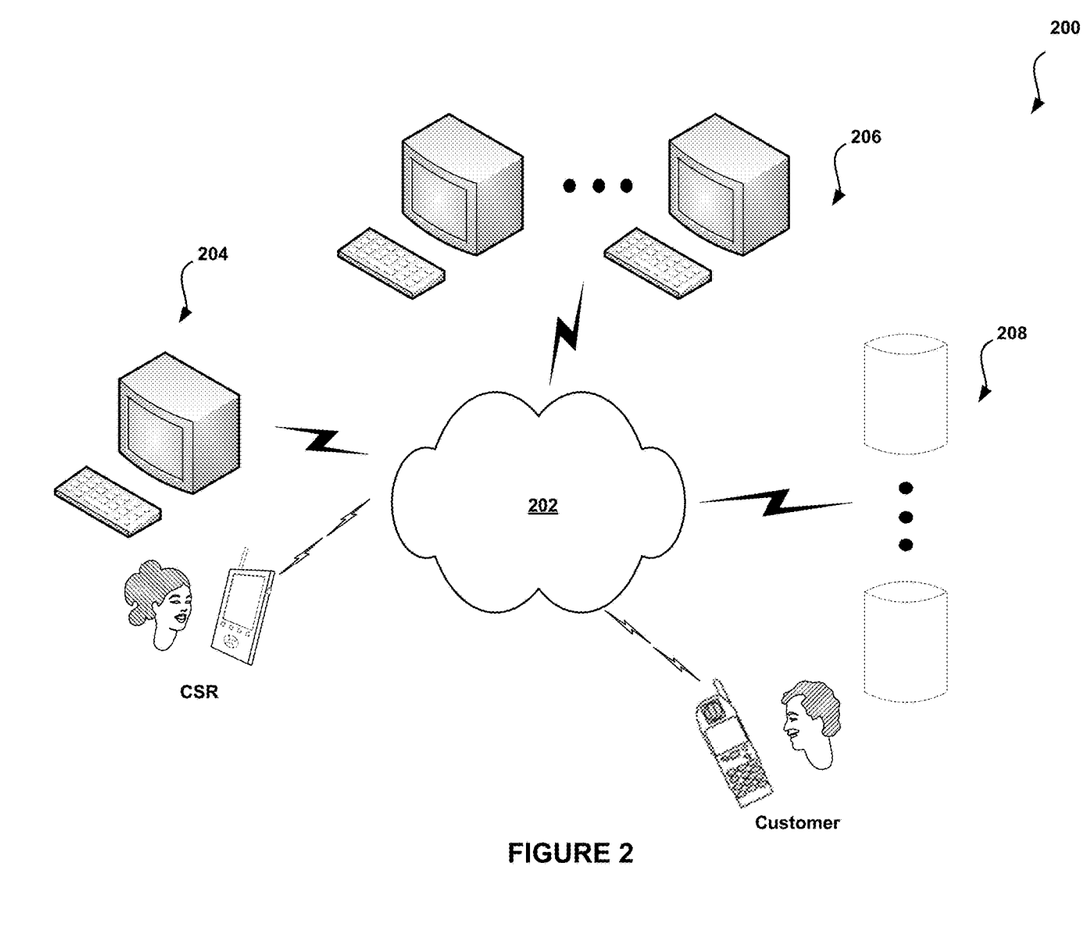
FIG. 2 shows a system for automatic management of intent classification, in accordance with one embodiment.

FIG. 2 shows a system 200 for automatic management of intent classification, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes an intent classification system 204 which may implement a variety of applications system 204 or software, etc. The intent classification system 204 may be capable of communicating with a plurality of systems 206, either directly or over one or more networks 202, for performing intent classification of various conversations. The intent classification system 204 is also in communication with one or more repositories 208, which may include conversation records (e.g. voice data, text transcripts, video data—which shows expressions, call context information, etc.) that may be analyzed to determine an intent of a user based on an utterance. In one embodiment, the intent classification system 204 may be part of a customer care system. Further, in one embodiment, the intent classification system 204 may utilize a software module called an intent classifier.

The intent classifier may be built by providing examples of utterances that express intent. The intent classifier may generalize the set of examples and then relate "unseen" utterances (expressing the intent in a different way) to the correct intent.

The intent classifier may be used as part of the intent classification system 204 and/or a customer care system for handling user queries and requests. In this context, intents can trigger business processes (BPs) for actual execution of the intent. Furthermore, in some cases the business process may require conducting a dialog with the end user.

The intent classification system 204 automates the process of creating and managing the intent classifier based on recorded interactions between users and human (or automated) customer support representatives. Managing the intent classifier includes initiation and classifier maintenance. Initiation includes collecting sample utterances and their correlating business processes (e.g. as recorded in BSS, etc.). Unmatched business processes to intents may be reviewed and new intents may be added by the intent classification system 204 as necessary.

Classifier maintenance includes adding or removing new sample utterances after the initiation process (e.g. in addition to running the initiation cycle again, etc.). Classifier maintenance may also include splitting an intent to multiple sub-intents or merging multiple intents into one new intent.

With respect to inputs to the intent classification system 204, the intent classification system 204 may receive or have access to a set of pre-defined business processes, at least one of which the customer service representative should follow during the interaction with the end user, along with the list of defined actions composing the business process. The intent classification system 204 may also receive or have access to a set of interactions between end users (e.g. customers, etc.) and a customer service representative. This may include either voice data or text transcripts (e.g. with a separation between the speakers, etc.). Of course, the intent classification system 204 may have the capability to analyze other media types, such as video, email, text, etc.

In various embodiments, the intent classification system 204 may apply some additional processing to voice data and video data (e.g. in addition to extracting transcripts, etc.). This may include determining characteristics such as mood, native language, urgency, etc., and associating such data with utterances, actions, and/or business processes, etc.

The intent classification system 204 will receive and/or have access to the list of business processes that the customer service representative selected for each interaction and the composition of actions taken by the customer service representative during the interaction. The actions taken may vary from the initially pre-defined actions included in the selected business process. For example, only part of the business process may have been executed. As another example, the customer service representative may have added some actions or eliminated others in the context of the specific user requests (e.g. and by doing so created a new business process that is not part of the pre-defined business process list, etc.). As another example, the customer service representative may have executed another (nested) business process or may have executed more than one business process in parallel. In one embodiment, a business process may be considered as executed by the intent classification system 204 even if there were intermittent steps executed.

In the context of the present description, a business process is defined as a set of instructions or actions, each with parameters. If the intent classification system 204 identifies a set of instructions associated with a business process being executed, even with tasks in between, this may be considered the execution of the business process by the intent classification system 204. A business process may also be a single instruction/action. A business process may be composed of steps, where the timing of each step and to which customer it is related are known. So the intent classification system 204 knows that a CSR performed step A at a particular time. Step A may be part of one or more business process.

The intent classification system 204 may also have access to, or receive, the list of products and/or services that were selected or ordered (per interaction) by a user. Further, the intent classification system 204 may also have access to, or receive, personal information of the end-user with which the interaction takes place (per interaction). This personal information may include, for example, location, gender, a communication service provider profile associated with the user (e.g. which products are used, interaction history, etc.), education, current location, device information from which the interaction takes place, hobbies, marriage status, age, and/or any other personal data.

The intent classification system 204 may utilize all or some of this input data to determine intent information, such as a reason (or multiple reasons) this person is calling (e.g. where there may be multiple possible intents, each with a probability, etc.).

To do this, in one embodiment, the intent classification system 204 may perform pre-processing of the interaction list including sorting each interaction based on the actions taken by the customer service representative. This may include identifying that: 1) the customer service representative selected a business process and completed the actions associated therewith in full; 2) the customer service representative selected a business process and completed only a part of it; 3) the customer service representative executed another nested business process (or multiple nested processes) within the same interaction; 4) the customer service representative added/eliminated actions based on specific user requests; 5) the customer service representative completed multiple business processes (not nested); or 6) the customer service representative did not do anything. Cases two through four may be the basis for the intent classification system 204 suggesting revisions to existing business processes and defining new business processes (i.e. updating a business process, etc.).

The intent classification system 204 will then perform an initial buildup of an utterance base, with a goal of generating/logging utterances for the pre-defined business processes. The intent classification system 204 may work on the interactions in which the selected business process was executed in full. If multiple business processes were executed in a single interaction, the intent classification system 204 may associate each business process with the information proceeding the execution of it by the customer service representative.

For each interaction, the intent classification system 204 may skip greeting phrases and take the initial non-greeting end-user sentence as an utterance intending the business process that the customer service representative selected for that interaction. To do this, the intent classification system 204 will recognize and identify the greeting phase and/or various possible greetings. Also, the intent classification system 204 may identity cases where the utterance shows the intent is deeper in the conversation. For example, the intent classification system 204 may identify and understand the user wants to buy a roaming plan out of a dialog that contains additional user inputs (e.g. destination, dates, etc.).

The intent classification system 204 may use interactions to compare against all other interactions to find what distinguishes business process X from others. The intent classification system 204 may use negative and positive samples for learning. Further, in one embodiment, there may be a pre-defined threshold of utterances that are needed for the intent classification system 204 to be consider ready and thus a well-trained classifier.

With respect to suggesting new business processes, any business process that was not executed as specified creates a candidate for a change in the set of business processes (i.e. a new sequence, new business process, etc.). The intent classification system 204 may also identify sequences that repeat a significant amount of times. Once a new business process is approved, the list of utterances with that intent may be built.

Sequences representing the same intent may not be identical. For example, the order of two consecutive actions within a longer sequence of actions may be switched [e.g. (a,b,c,d,e)→(a,b,d,c,e)]. In some instances an action may be omitted or added [e.g. (a,b,c,d,e)→(a,b,d,e) or (a,b,f,c,d,e)].

Counting the repetitions of new sequences by the intent classification system 204 will account for such variations. One way the intent classification system 204 may separate variations, or omitted/added actions, is by looking at utterances [e.g. to separate (a,b,c,d,e)→(a,b,d,e)]. If variations can be separated significantly, such variations likely belong to different business processes.

With respect to maintenance of the intent classifier, the intent classification system 204 will consider splits of business processes as well as mergers, as well as adding/removing business processes. For business processes that were not executed in full, the intent classification system 204 may aggregate all the instances of each such business process. The intent classification system 204 may identify whether there is a certain subset that repeats a statistically-significant amount. Such a subset may then be suggested as a split of the original intent/business process. The remaining subset may define a new intent as well. However, the remaining subset may not be expressed by utterances in the input interaction set.

If the intent classification system 204 can separate the subset variations, the intent classification system 204 can identify each subset better. For example, buying a phone may be separated from buying a smart phone. The business process for buying a new smart phone may be straight-forward, but the suggestions of which phone to offer, if "smart" is not mentioned, is also impacted (e.g. by user statistics of what worked).

For business processes that were executed in full but without a match to the former intent list, the intent classification system 204 may aggregate all the instances of each such business process. The intent classification system 204 may identify whether there is a certain subset that repeats a statistically-significant amount, and identify whether there is a clustering reason such as a product ordered or a selected service. Such a subset may then be suggested as a split of the original intent/business process.

With respect to merging business processes, the intent classification system 204 may aggregate nested business processes according to the initial intent and the nested intent. In the case such a couple is repeated a statistically-significant amount of times, the couple may be suggested as a merged intent. This may also be implemented for actions usually executed together even if they are not nested. For example, if some people want business process XY, but few want just X and few want just Y, the intent classification system 204 may have three business processes, X, Y, and XY and learn when to use each.

In one embodiment, the intent classification system 204 may aggregate interactions in multiple languages, all relating to the same pre-defined business processes. In such cases, it may be beneficial for the intent classification system 204 to translate the interactions into a "master" language on which the analysis will be perform in order to increase the amount of input data. The intent classification system 204 may save the original language utterances/interactions with the translated interactions. Once the analysis is done, the original language utterances related to a certain intent can be retrieved or translated to all relevant languages in order to train language-specific classifiers. This will enable the intent classification system 204 to start in a new language when it does not have data for classification, using previous interactions in other languages to start rapidly.

Further, the intent classification system 204 may also be utilized for detecting pleasantries and other speech. It is also possible that multiple business process are related to a topic (e.g. buying a device, paying, initiating a complaint, a new program, etc.) and from the aggregation the intent classification system 204 will get more data and the machine learning will be faster.

Business process guess/estimation is of course not only based on utterances but may also be based on demographics and intent. If there are multiple providers, each with its own business process, some business processes may be common and they could share information, thus improving analysis. This could be the same provider in a different geographical location with different plans, but the intersection may be large.

Figure 3:
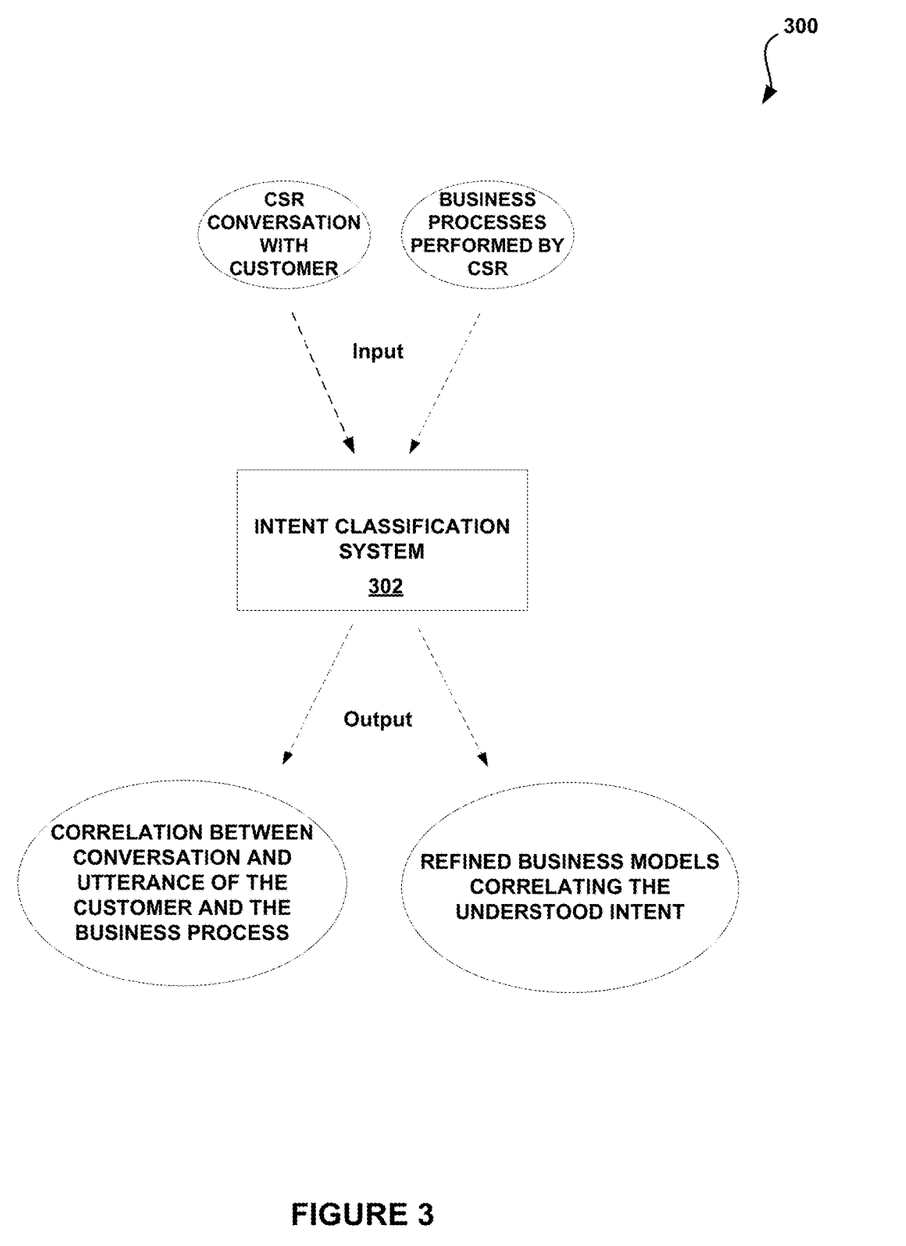
FIG. 3 illustrates a system flow diagram for automatic management of intent classification, in accordance with one embodiment.

FIG. 3 shows a system flow diagram 300 for automatic management of intent classification, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

In operation, the intent classification system 302 analyzes intent in the context of defined business processes. The inputs to this analysis include the conversation between the customer and the customer service representative and also the business process that the customer service representative executes. Initially this may be used to determine the correlation between a conversation, utterance of the customer, and the business process, and subsequently may be used to figure out what business process to execute in the future based on user determined intent.

The intent classification system 302 may be utilized to refine business models, correlating the understood intent with the actual actions performed by the customer service representative. So not only the business process is identified, but the intent classification system 302 can verify that it is followed. For business process that are not followed, the intent classification system 302 may take corrective actions (e.g. if the data statistically merits it, etc.), such as creating new business processes, merging business processes, etc.

The input stream used in the analysis may be both the full conversation as well as the actions of the customer service representative, and the output may be a new business process, or a new business process scheme, which may be automatically created in the analysis (e.g. automatically created in the sense that the intent classification system 302 sees that the customer service representative preformed those business process in response to specific customer interaction, etc.). The intent classification system 302 can then offer those new business processes, or new business process schemes, to other customer service representatives or the intent classification system 302 may preform them automatically in response to customer interactions. In one embodiment, any new business process offered by the intent classification system may be reviewed and approved/denied by a human operator.

Figure 4:
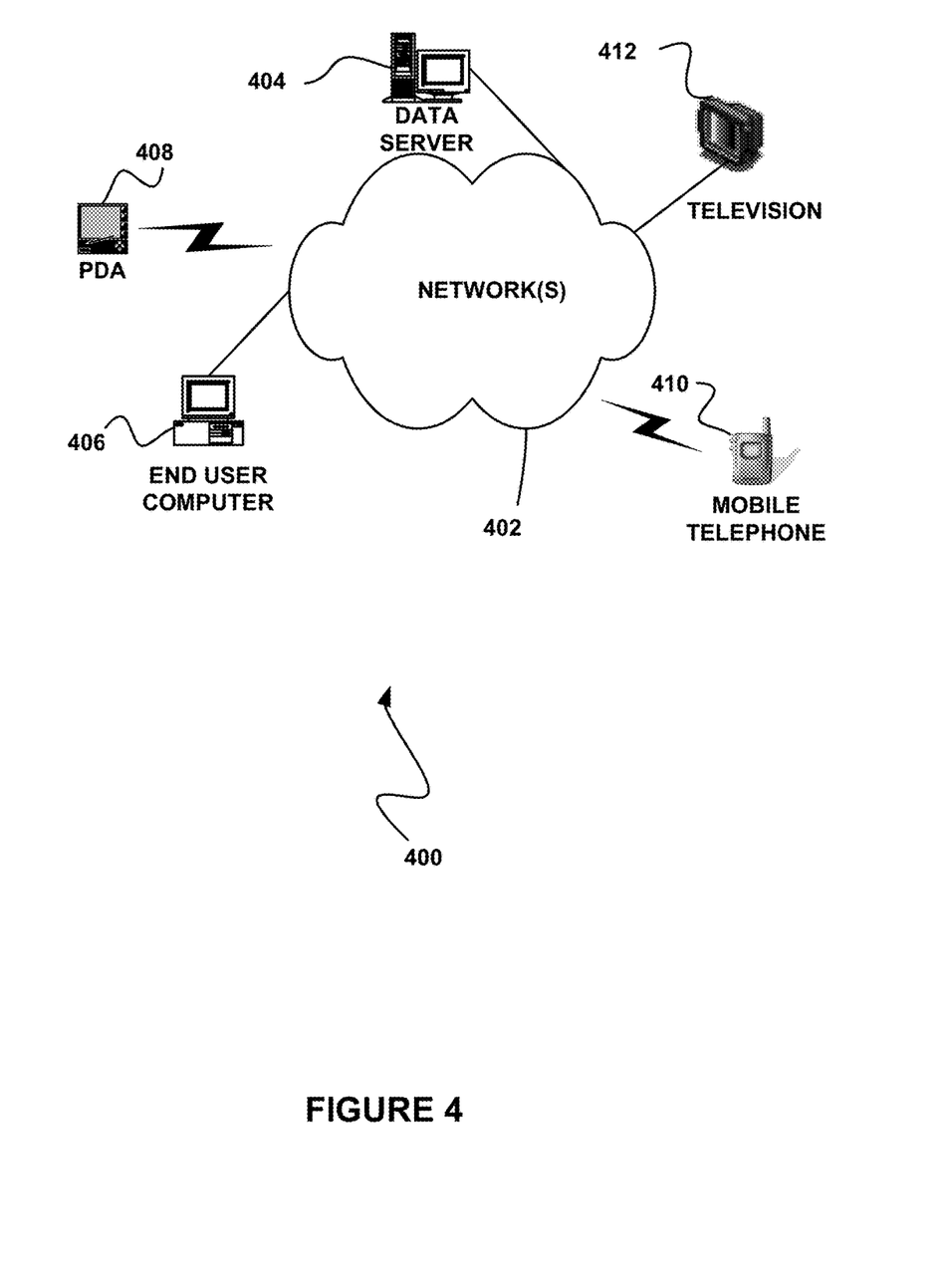
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
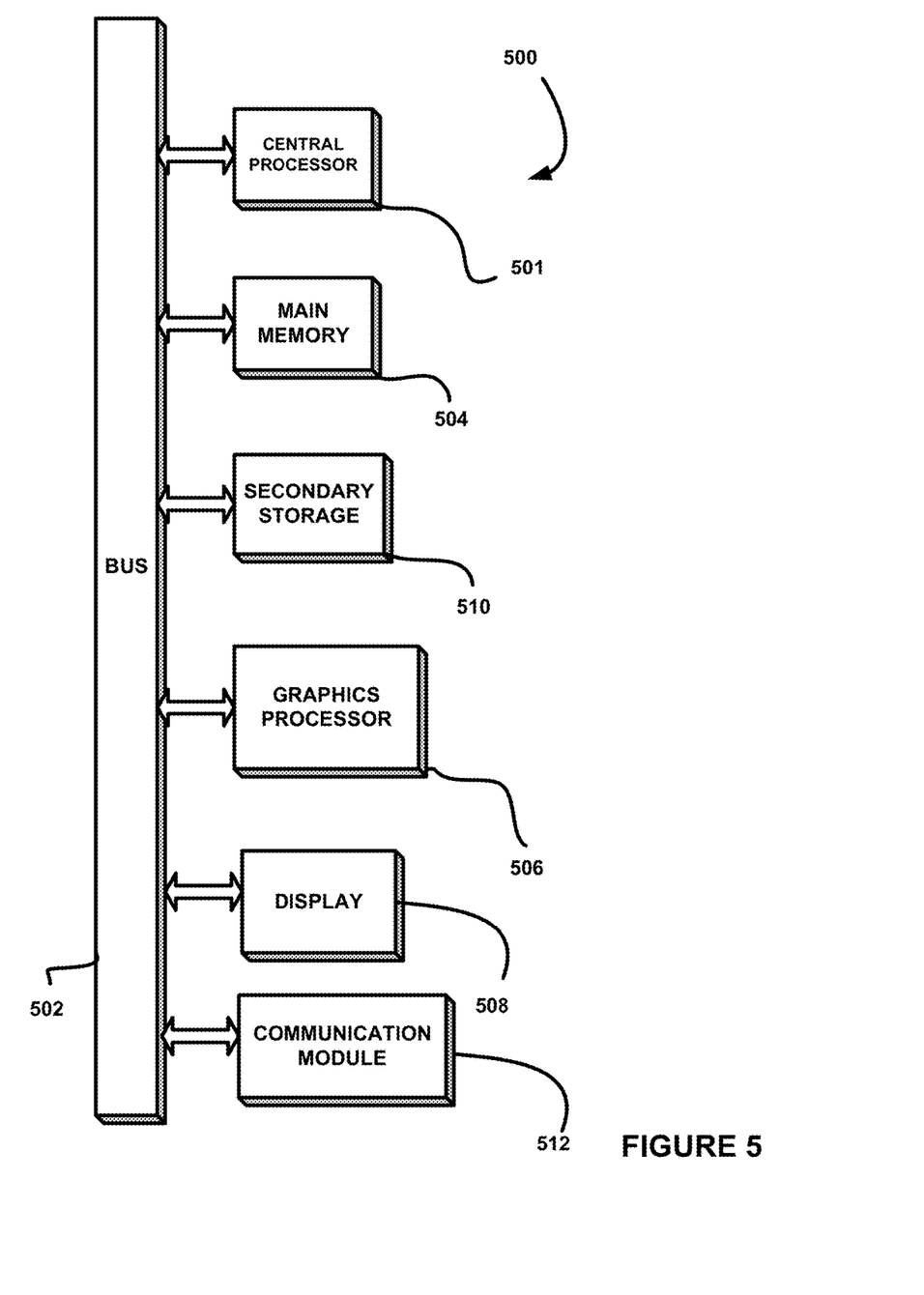
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
identifying, by an intent classification system, a recorded conversation including a plurality of utterances of a user during a call made by the user to a customer service representative (CSR);
identifying, by the intent classification system, one or more actions performed by the CSR as a result of the utterances;
correlating, by the intent classification system, at least one of the one or more actions to at least one of the plurality of utterances using a time stamp of the at least one of the one or more actions and a time stamp of the at least one of the plurality of utterances;
identifying data describing the user;
correlating the data describing the user to the at least one of the plurality of utterances;
automatically determining, by the intent classification system, an intent of the user based on the at least one of the one or more actions that are correlated to the at least one of the plurality of utterances and based on the data describing the user that is correlated to the at least one of the plurality of utterances, the intent of the user being at least one reason for the call made by the user to the CSR;
storing, by the intent classification system, an indication of the intent based on the at least one of the plurality of utterances; and
generating, by the intent classification system, a new business process that includes the at least one of the one or more actions;
associating, by the intent classification system, the new business process with the indication of intent;
identifying, by the intent classification system, a subsequent utterance of an additional user during a call made by the additional user to the CSR;
using, by the intent classification system, the subsequent utterance to automatically identify an intent of the additional user as being the at least one reason for the call made by the user to the CSR; and
performing the new business process responsive to automatically identifying the intent of the additional user.

2. The computer program product of claim 1, wherein the conversation including the plurality of utterances includes a verbal conversation that has been converted into text transcripts.

3. The computer program product of claim 1, wherein the one or more actions performed are logged in a manner that correlates to corresponding portions of the plurality of utterances.

4. The computer program product of claim 1, wherein the one or more actions include portions of a business process.

5. The computer program product of claim 1, wherein the one or more actions include a business process.

6. The computer program product of claim 1, wherein the one or more actions include a plurality of business processes.

7. The computer program product of claim 1, wherein the data describing the user includes one or more of: a location associated with the user, a gender associated with the user, a profile associated with the user, or an age associated with the user.

8. A method, comprising:
identifying, by an intent classification system, a recorded conversation including a plurality of utterances of a user during a call made by the user to a customer service representative (CSR);
identifying, by the intent classification system, one or more actions performed by the CSR as a result of the utterances;
correlating, by the intent classification system, at least one of the one or more actions to at least one of the plurality of utterances using a time stamp of the at least one of the one or more actions and a time stamp of the at least one of the plurality of utterances;
identifying data describing the user;
correlating the data describing the user to the at least one of the plurality of utterances;
automatically determining, by the intent classification system, an intent of the user based on the at least one of the one or more actions that are correlated to the at least one of the plurality of utterances and based on the data describing the user that is correlated to the at least one of the plurality of utterances, the intent of the user being at least one reason for the call made by the user to the CSR;
storing, by the intent classification system, an indication of the intent based on the at least one of the plurality of utterances; and
generating, by the intent classification system, a new business process that includes the at least one of the one or more actions;
associating, by the intent classification system, the new business process with the indication of intent;
identifying, by the intent classification system, a subsequent utterance of an additional user during a call made by the additional user to the CSR;
using, by the intent classification system, the subsequent utterance to automatically identify an intent of the additional user as being the at least one reason for the call made by the user to the CSR; and
performing the new business process responsive to automatically identifying the intent of the additional user.

9. An intent classification system comprising one or more processors operable for:
identifying, by the intent classification system, a recorded conversation including a plurality of utterances of a user during a call made by the user to a customer service representative (CSR);
identifying, by the intent classification system, one or more actions performed in by the CSR as a result of the utterances;
correlating, by the intent classification system, at least one of the one or more actions to at least one of the plurality of utterances using a time stamp of the at least one of the one or more actions and a time stamp of the at least one of the plurality of utterances;
identifying data describing the user;
correlating the data describing the user to the at least one of the plurality of utterances;
automatically determining, by the intent classification system, an intent of the user based on the at least one of the one or more actions that are correlated to the at least one of the plurality of utterances and based on the data describing the user that is correlated to the at least one of the plurality of utterances, the intent of the user being at least one reason for the call made by the user to the CSR;

storing, by the intent classification system, an indication of the intent based on the at least one of the plurality of utterances; and generating, by the intent classification system, a new business process that includes the at least one of the one or more actions;

associating, by the intent classification system, the new business process with the indication of intent;

identifying, by the intent classification system, a subsequent utterance of an additional user during a call made by the additional user to the CSR;

using, by the intent classification system, the subsequent utterance to automatically identify an intent of the additional user as being the at least one reason for the call made by the user to the CSR; and performing the new business process responsive to automatically identifying the intent of the additional user.

10. The computer program product of claim 1, wherein the one or more actions performed by the CSR as a result of the utterances include an existing business process completed only in part by the CSR, and wherein the new business process is the part of the existing business process completed CSR.

11. The computer program product of claim 1, wherein the one or more actions performed by the CSR as a result of the utterances include multiple nested processes, and wherein the new business process is the multiple nested processes.

* * * * *